United States Patent
Nagendran

(10) Patent No.: US 6,731,940 B1
(45) Date of Patent: May 4, 2004

(54) METHODS OF USING WIRELESS GEOLOCATION TO CUSTOMIZE CONTENT AND DELIVERY OF INFORMATION TO WIRELESS COMMUNICATION DEVICES

(75) Inventor: Uday Nagendran, Milpitas, CA (US)

(73) Assignees: Trafficmaster USA, Inc., Wilington, DE (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/561,319

(22) Filed: Apr. 28, 2000

(51) Int. Cl.[7] .................................................. H04Q 7/20
(52) U.S. Cl. .................................. 455/456.1; 455/456.5
(58) Field of Search ................................ 455/456, 457, 455/450, 562, 456.1, 456.2, 456.5, 464; 340/905

(56) References Cited

U.S. PATENT DOCUMENTS

| | | | | |
|---|---|---|---|---|
| 5,396,429 A | * | 3/1995 | Hanchett | 340/910 |
| 5,432,542 A | | 7/1995 | Thibadeau et al. | 348/6 |
| 5,493,709 A | | 2/1996 | Duckect et al. | 455/185.1 |
| 5,548,586 A | | 8/1996 | Kito et al. | 370/60 |
| 5,565,909 A | | 10/1996 | Thibadeau et al. | 348/9 |
| 5,625,668 A | * | 4/1997 | Loomis et al. | 342/357.1 |
| 5,627,549 A | | 5/1997 | Park | 342/357 |
| 5,636,245 A | | 6/1997 | Ernst et al. | 375/259 |
| 5,684,859 A | | 11/1997 | Chanroo et al. | 379/58 |
| 5,818,385 A | * | 10/1998 | Bartholomew | 342/372 |
| 5,898,680 A | | 4/1999 | Johnstone et al. | 370/316 |
| 5,900,825 A | | 5/1999 | Pressel et al. | 340/905 |
| 6,018,317 A | * | 1/2000 | Dogan et al. | 342/378 |
| 6,026,304 A | * | 2/2000 | Hilsenrath et al. | 455/456.2 |
| 6,064,339 A | * | 5/2000 | Wax et al. | 342/417 |
| 6,084,546 A | * | 7/2000 | Wax et al. | 342/378 |
| 6,108,533 A | * | 8/2000 | Brohoff | 455/414 |
| 6,112,095 A | * | 8/2000 | Wax et al. | 455/456 |
| 6,115,611 A | * | 9/2000 | Kimoto et al. | 455/422 |
| 6,236,365 B1 | * | 5/2001 | LeBlanc et al. | 342/457 |
| 6,249,252 B1 | * | 6/2001 | Dupray | 342/357.01 |
| 6,249,680 B1 | * | 6/2001 | Wax et al. | 455/456 |
| 6,288,675 B1 | * | 9/2001 | Maloney | 342/457 |
| 6,397,082 B1 | * | 5/2002 | Searle | 455/434 |
| 6,404,750 B1 | * | 6/2002 | Wicker et al. | 370/329 |
| 6,505,046 B1 | * | 1/2003 | Baker | 455/456.3 |

* cited by examiner

Primary Examiner—Nay Maung
Assistant Examiner—Tan Trinh
(74) Attorney, Agent, or Firm—Townsend and Townsend and Crew LLP

(57) ABSTRACT

The present invention provides a method for finding the location of a mobile device user, and using the location to customize the information and to determine the way of delivering such information to the user. The mobile device user may request the information either with an interactive series of one or more requests, or by pre-selecting the type of message to be delivered. The customized information is transmitted only to the mobile device from which the request is originated. It can also be displayed at a public display unit (such as an electronic billboard), sent to a public broadcaster, posted on the Internet, or sent to a fax machine or a modem. The present invention also provides a method for determining traffic density and speed information that can be continuously updated. The traffic information together with a variety of traffic services can be transmitted to mobile devices users, displayed at inanimate devices (such as electronic billboards), publicly boradcasted, or posted on the Internet.

35 Claims, 4 Drawing Sheets

METHODS OF USING WIRELESS GEOLOCATION TO CUSTOMIZE CONTENT AND DELIVERY OF INFORMATION TO WIRELESS COMMUNICATION DEVICES

FIELD OF THE INVENTION

This invention relates generally to wireless communications systems. More particularly, it relates to providing location-based information to mobile communication devices.

BACKGROUND ART

As wireless communications rapidly spread into every walk of modern life and approach a state of ubiquity, the demand for the bandwidth (or content) of information transmission in wireless communications networks is also growing. A great deal of effort has been devoted to providing location-specific information to mobile device users in a timely, accurate, interactive, and customized manner, that in turn reduces the bandwidth need and required user interaction.

U.S. Pat. No. 5,636,245, for example, describes a method for determining whether access to particular information transmitted by a broadcaster is appropriate for a particular remote unit (such as a mobile device). The method is particularly useful for distributing situation awareness information. U.S. Pat. No. 5,493,709 discloses a radio receiver using current frequency and coordinate data transmitted by a mobile device as a basis for selecting traffic message pertinent to the user of the device, such that traffic data are automatically selected without requiring traveler's input. U.S. Pat. No. 5,548,586 discloses a mobile packet communication system and method which are capable of transmitting packet data only to a selected base station in whose service cell a mobile device requesting the data is operating, without transmitting the data to all base stations in the same area. U.S. Pat. No. 5,684,859 discloses a system for providing paging information to roaming subscribers in a convenient and efficient manner to make the change of geographic area as seamless as possible. U.S. Pat. No. 5,898,680 describes a system and method for distributing data (particularly map data and other types of image data) to users by means of a radio frequency link, so that up-to-date data can be obtained as frequently as needed. (In this case, although remote users can obtain data selectively, there is no two-way communication between the users and the source of the data.) U.S. Pat. No. 5,900,825 describes a system and method for providing information to an operator of a vehicle. It requires, however, the vehicle to be equipped with a position determining means (using GPS or signals received from a local transmitter site, for example) and compares the position of the vehicle to the location indicated by each message. When a match is found, the receiver system provides the matching message to the operator. U.S. Pat. No. 5,627,549 describes a system and method for sending specific time and location sensitive advertising information to a moving vehicle. There have also been other efforts on transmitting messages targeted to a specific geographical group of mobile device users, as exemplified by U.S. Pat. Nos. 5,565,909 and 5,432,542.

With prior art systems, the users of mobile communication devices are not allowed to communicate with their respective information service networks in an interactive and personalized manner to tailor information received in the context of their location for example. That is, the information is generic and broadcast to a group of users in the same geographical region, rather than being tailored and targeted to a particular user. Moreover, some of the prior art systems require a third party device, such as a GPS unit, to facilitate generating and delivering the location information.

What is needed in the art, therefore, are innovative ways of delivering accurate location-specific information to mobile device users in an interactive, user-tailored and multimedia fashion without requiring the user's mobile device to have inherent location capability.

SUMMARY

The present invention provides a method for using the RF signal characteristics, or information derived therefrom, of the receiving wireless device to customize the delivery and or content of information to the receiving wireless device, for one or more wireless devices, including, but not limited to, mobile wireless communication devices. In addition, information can be customized by criteria selected by the wireless device user, the information content provider, or the information broadcaster. Customization of information can include generating, modifying, and/or deleting the information content, and regulating the delivery of information content to the mobile device so as to optimize the usage of capacity and decrease the burden on the user.

Information that can be transmitted to wireless devices may reside in a remote database. Information can be content for delivery to wireless devices and criteria to regulate that delivery. Information content can be generic, location and/or velocity centric, and location and/or velocity modified generic data. Examples of generic content are: product promotions, facility usage directions, neighborhood yard sales and events, road and civil construction, and area map information.

Examples of location and/or velocity based content are: mobile device current location, average traffic speed on current or alternate roadway sections, traffic alerts of congested or slow-speed areas, and current directional bearing of travel. An example of location and/or velocity-modified generic content is: dating service based on proximity of wireless device users.

In addition, delivery criteria may be associated with the information content, and can be used to regulate the transmission of the information content. Delivery criteria can be related to the content-provider, the user, and/or the broadcast service provider.

Delivery criteria provided by the information content provider can include, but is not limited to time and duration criteria. Examples of time criteria may include store operation hours associated with particular information content, and time periods associated with scheduled road maintenance. Examples of duration criteria may include the amount of time after content posting to transmit content associated with promotional details in the content, or the amount of time after transmission of the content that the content is valid for, and/or other time-sensitive matters related to the content.

User related delivery criteria may be related to location and personal preferences of the user. Location-related criteria may include, but is not limited to location information, and/or mobile device movement information such as distance, speed, and/or bearing. Examples of location information criteria may include the location of stores selling a product contained in the information content, the location of a traffic accident, or the road containing a traffic accident. Examples of mobile device distance information may include the maximum distance between a mobile device and a store contained in the information content, or the maximum distance between a mobile device and a public danger, such as a traffic incident that may be blocking an exit. An example of mobile device speed information may include a speed range that traffic is moving on a road or highway and information content suitable for highway travelers who may be benefited by the knowledge of that information. An example of mobile device direction information may include information content that can be sent when a receiver is less than a first maximum distance away and conditionally sent if the receiver is less than a second, greater maximum distance and the receiver direction is towards the location associated with the information content.

A mobile device user can provide user-related criteria to information providers or information broadcasters by requesting location-specific information either with an interactive series of one or more requests, or by pre-selecting the type of message to be delivered. Pre-selected conditions for a message may include, time, location, radial distance, commercial services, advertising information, pricing information, traffic conditions or events, and public safety and emergency announcements, to name but a few.

Location of a mobile device is determined using at least one location determining base station site. Information meeting the pre-selected conditions is then transmitted to the mobile device from which a request originated or which was preselected by the user, without imposing any special requirement on the user's device, or involving a third party (e.g., GPS, or a plurality of base stations). Location-specific information that is time sensitive also can be delivered in real-time or close to real-time. Moreover, location-specific information alternatively can be displayed at a public display unit (such as an electronic billboard), posted on the Internet, or sent to a fax machine, printer, variable message sign, local range radio or a modem. By application of this capability, the present invention also enables an information service network to generate and deliver location-specific information tailored to a plurality of mobile device users.

In accordance with one embodiment of the present invention, an antenna array at a base station receiver of an information service network receives direct path and multipath signals transmitted from a mobile device. The base station determines one or more signal signatures from a subspace of array covariance matrices derived from the received signals. The signature then is compared to a database of calibrated signal signatures and corresponding locations, and a location , which has a calibrated signature best matches the measured signature is selected as the most likely location of the mobile device. In accordance with one embodiment of the present invention, the database of calibrated signal signatures and corresponding locations is generated by a calibration procedure in which a calibration mobile device transmits location data derived from a GPS system to the base station which records the location information together with the signal signature of the calibration device. A more detailed description of this method is given in U.S. Pat. No. No. 6,026,304 issued on Feb. 15, 2000 to Hilsenrath et. al., the entirety of which is incorporated by reference for all purposes.

Knowing the location of the mobile device in an accurate and timely fashion allows the information service network to determine the information that the mobile device user is interested in, and consequently delivers the pertinent information in a timely fashion. The information service network may provide further information to the user in an interactive and user-tailored fashion, or update the information on a regular or a pre-scheduled basis.

In accordance with another aspect of the above location finding method is that it needs only a single base station, in contrast to multiple base stations employed in the prior art methods. Moreover, it does not impose any specific requirement on the mobile device, therefore allowing the wireless network to support all types of mobile devices currently deployed.

Further, the method does not impose a requirement on the mobile device to be communicating with the location network at the time of location determination.

Using a location-finding method of the present invention, traffic density and speed information readily can be generated and continuously updated. Accordingly, real-time traffic information and services, commercial services, and public safety and emergency announcements can be transmitted to mobile device users, displayed at passive display devices (such as electronic billboards) placed in one or more designated areas, or a combination of both. Such information also can be broadcast publicly, posted privately on the Internet, or sent to fax machines or modems.

Furthermore, merchants and information kiosk users can benefit from the ability to send and/or receive location-specific information of interest, such as targeted advertisements and special services, to travelers and shoppers.

The novel features of this invention, as well as the invention itself, will be best understood from the following drawings and detailed description.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention employs systems and methods for accurately determining the location of mobile devices using a single base station. More specifically, signals transmitted by a mobile device are detected by an antenna array at a base station that is part of an information service network (e.g., a cellular telephone network Based upon the signals received, the base station determines a signal signature, which can be a subspace of an array covariance matrix constructed from a set of p-dimensional array vectors derived from the received signals. In general, the signal signature is any location-dependent feature derived from the set of direct and multipath signals received at the antenna array of the base station transmitted from a given location.

The signature may be derived from any combination of amplitude, phase, delay, direction, and polarization information of the signals.

Preferably, the signature is substantially invariant with respect to all variables unrelated to the location of interest, such as noise. A more detailed description of this method is given in U.S. Pat. No. 6,026,304, issued on Feb. 15, 2000 to Hilsenrath et. al., the entirety of which is incorporated by reference for all purposes.

After the signal signature has been determined, it is then compared to a database of calibrated signal signatures and corresponding locations. The database of calibrated signal signatures and corresponding locations can be generated by a calibration procedure in which GPS location data of a calibration mobile unit is associated with the signal signature of the calibration mobile unit received at the base station. By searching such a database, a location which has a calibrated signature associated with it that best matches the measured signature is selected as the most likely location of the mobile device. The entire location finding process takes place within seconds, fractions of seconds or near real-time.

A feature that distinguishes this method of location finding from the prior methods is that it can accurately determine a location from a single base station, in contrast to multiple base stations employed in the prior art. A further aspect of this method of location finding is that it can determine the position of any mobile device, not limited to those subscribing to a given information service network or currently communicating with the location network.

Figure 1:
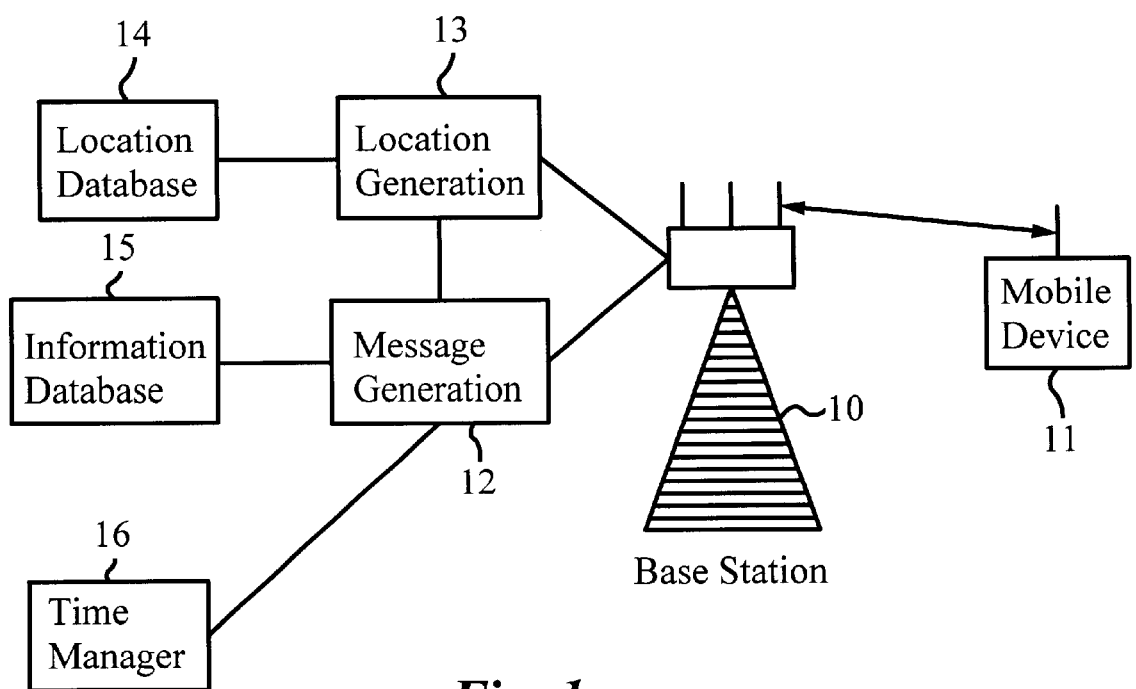
FIG. 1 depicts one embodiment of a method of the present invention for generating and delivering location-specific information to a mobile communication device.

FIG. 1 depicts one embodiment of the present invention for generating and delivering location-specific information to a mobile device user. A single site base station 10, equipped to receive signals with an antenna array, receives a request for information from a mobile device 11. The request is then forwarded to a message generator 12. Both the base station 10 and the message generator 12 are connected to a location generator 13, which, in turn, is connected to a location database 14. The location generator 13 determines location information from the received signals by using, for example, the location finding method describe above, and sends the location information so obtained back to the message generator 12. The message generator 12 then compiles the location information with other information pertinent to the specific location of interest, which comes from an information database 15. (The information database is assumed to be a part of the information service network hereinafter, although it can also be an external information service provider with which the network is in communication.) A time manager 16 also may provide an input to the message generator, if time sensitive issues are involved. The compiled message comprising requested location-specific information is then sent from the message generator 12 to the base station 10, and subsequently transmitted to the mobile device 11 by the base station 10.

Upon receiving the location-specific information, the mobile device user may send one or more follow-up requests to express certain preferences (for a gas station, a restaurant, or a shopping center, for instance), or require additional information. The information service network will respond accordingly. There can be a sequence of back-and-forth communications between the mobile device user and the network.

Figure 2:
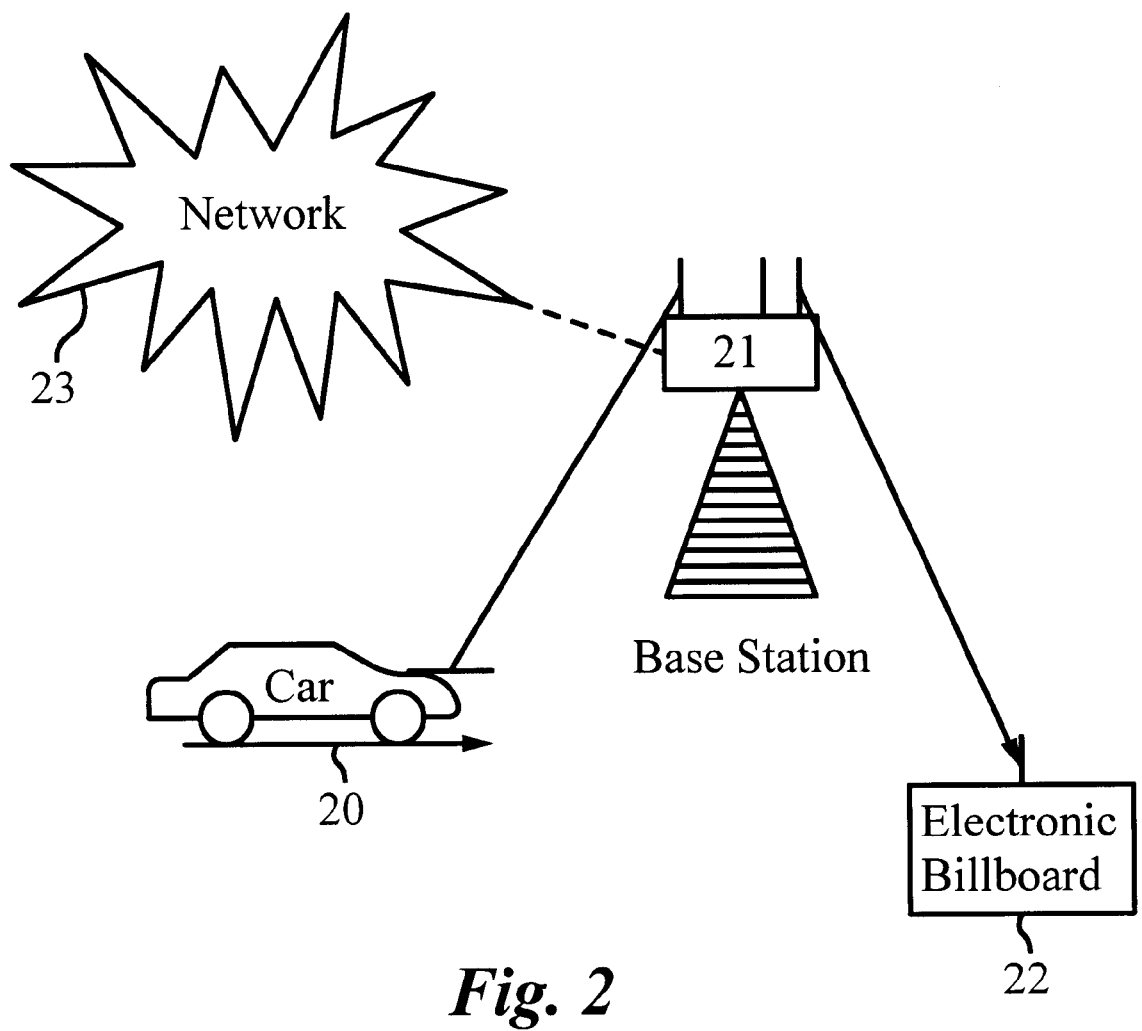
FIG. 2 shows another embodiment of the present invention for generating and delivering location-specific information to an inanimate device.

The information requested by the mobile device user also can be transmitted to a public display unit, such as an electronic billboard, as depicted in FIG. 2. In accordance with this exemplary embodiment, a motorist 20 on a roadway sends a request for information (for example, the location of the nearest gas station) to a base station 21 of an information service network 23. The base station is also in communication with an electronic billboard 22 placed along the traveling path of the motorist. The base station 21 transmits the requested information, or information deemed appropriate by the network, to the electronic billboard 22, to be viewed by the motorist. (The base station may or may not notify the motorist about the location of the message being displayed.)

Moreover, a mobile device user can request information to be delivered in a pre-selected and pre-scheduled manner. For example, a user may request a message to be displayed on a billboard placed on a specific roadway on a specific day, so that a target user will be greeted with the message when driving past the sign on that day. A traveling sales person may want information about local weather, food and lodging services to be delivered to him/her through a mobile device (or a public display unit placed at an airport, or train station) upon arriving in each city on his/her journey. Such information also can be made available on the Internet, or sent to the person's fax machine or modem.

Figure 3:
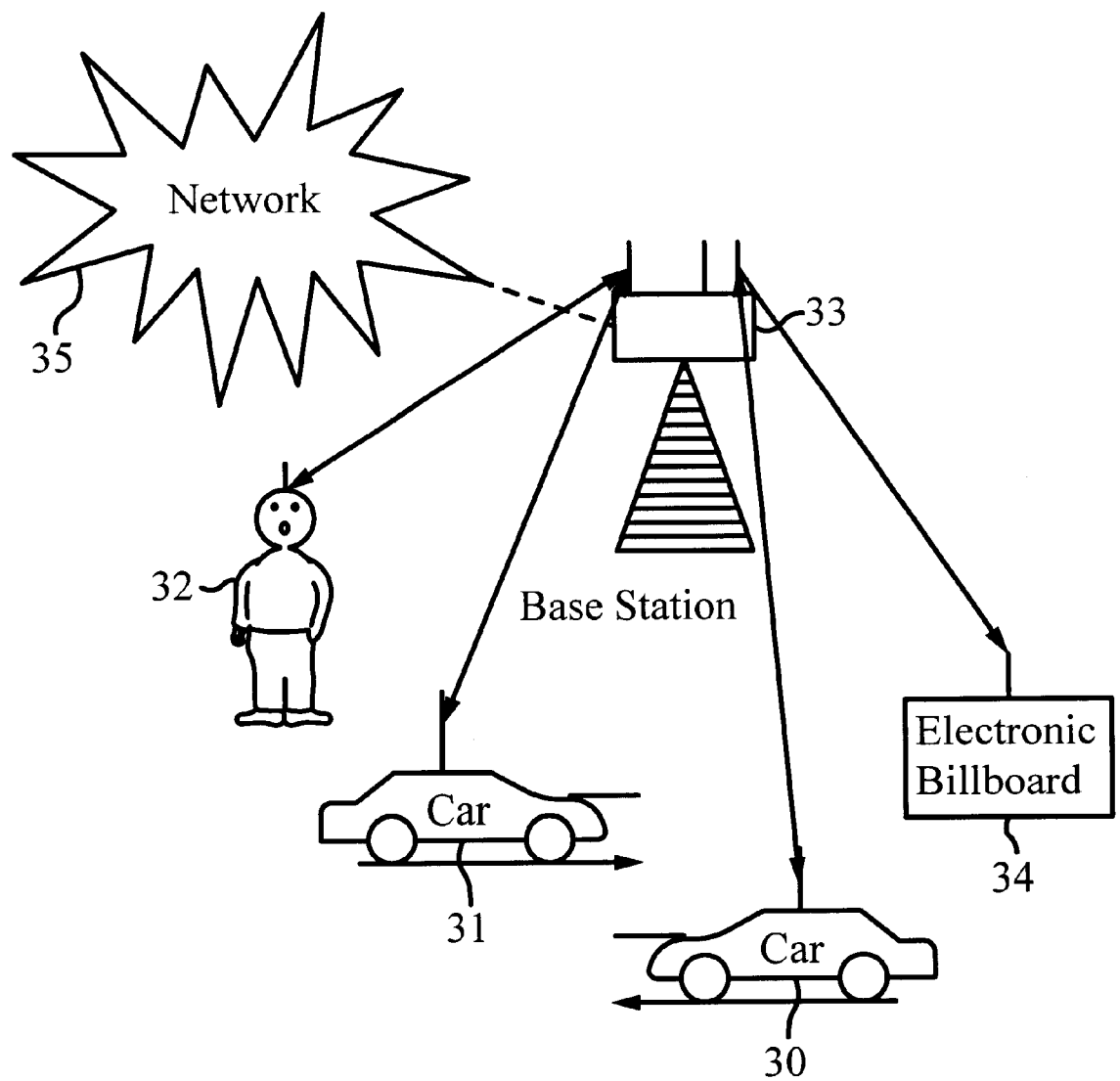
FIG. 3 depicts yet another embodiment of the present invention for generating and delivering location-specific information tailored to a plurality of mobile communication device users.

FIG. 3 shows another embodiment of the present invention. A plurality of mobile device users, including motorists 30 and 31 and a pedestrian 32, send information requests to a base station 33 of an information service network 35. The nature and content of information requested may vary from one user to another. For example, the motorist 30 may request for the location of the nearest gas station; the motorist 31 may inquire about the location of the nearest shopping mall; whereas the pedestrian 32 may want to know the location of the nearest restaurant. These information requests are processed at the network, and the replies to these requests are subsequently directed to the respective mobile users by the base station 33. One or more replies can also be displayed at a designated public display unit 34. The replies to information requests may be in the form of text messages, interactive voice responses, a voice from a live operator, or any other means of replying to such requests and displaying responses.

Figure 4:
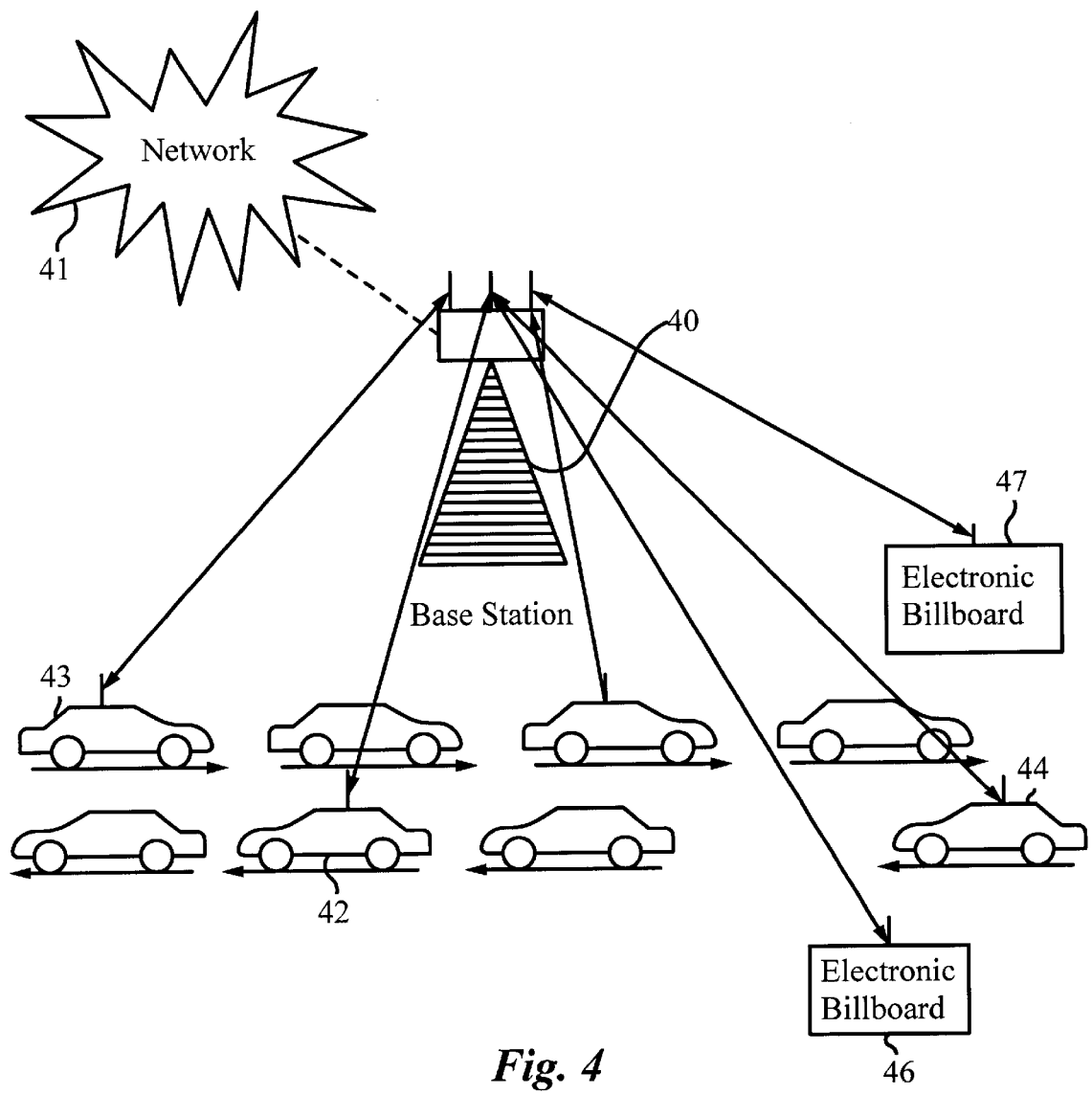
FIG. 4 shows an exemplary embodiment of the present invention for determining traffic density and speed on a roadway.

The present invention also provides a method for determining traffic density and speed on roadways, as illustrated in FIG. 4. A base station 40 of an information service network 41 receives signals from a plurality of mobile device users, such as users 42, 43, 44, and 45, traveling in a roadway segment. By determining the locations of these users, the information service network can provide an estimate of the density of travelers in the segment of interest. Moreover, by continuously sampling the signals transmitted by the users on the roadway at certain time intervals, the network can derive an estimate of the speed of traffic in the segment of interest. The traffic density and speed information thus obtained is stored in a traffic database at the network. The information service network can send such traffic information to mobile device users on the roadway upon request, or display the traffic information at one or more public display units, such as units 46 and 47 along the roadway that can be continuously updated. In addition, the traffic information can be forwarded to a central database where information can be compiled, archived and otherwise stored for later retrieval.

The information service network can compile an extended traffic database by sampling traffic densities and speeds in different segments of a roadway and on various roadways in a specific geographical area. Using this information, the information service network can offer a variety of traffic services to mobile device users traveling in the area accordingly. For instance, it can alert the users of traffic congestion or other hazardous conditions occurring in a particular roadway segment upon request or on a pre-scheduled basis, and suggest alternative routes to those who may have intended to travel to the problematic segment. It also can diligently monitor the users who are approaching the problematic segment and automatically send out traffic avoidance messages. Moreover, the traffic database generated at the network can be shared with traffic controllers, public broadcasters (e.g., television and radio broadcasters), or posted on the Internet, so to inform the public at large. Traffic engineers can use the traffic database to study the correlation between one congested segment and others, so to provide more effective travel planning services. In addition, public safety and emergency announcements, commercial advertising information, and many other services can also be made available to mobile device users. In all cases, the present invention enables the delivery of these services to be timely, effective, comprehensive and seamless.

The method of the present invention for generating and delivering traffic information, commercials, information and corresponding services is not limited to roadway traffic. It also can be applied to pedestrian traffic, air traffic, marine traffic, ski traffic, delivery fleets, commercial vehicle operators and many other types of traffic. Moreover, the method of the present invention can be used to monitor demographic pattern and behavior.

An instance of such a pattern might be the observation of traffic flow whether vehicular or pedestrian. Such information may be used to determine the routes most commonly taken. This information can act as the basis of planning studies, marketing plans and positions of public messages. It also can be used by the operators of cellular and other wireless networks to deploy capacity sites or reposition existing assets to maximize the usage of those assets. Such planning is typically performed by labor intensive and expensive processes, which may now be easily automated.

Expand to fleet management. It is another purpose of the invention to deliver route information to a mobile device after the mobile device user has provided at least a destination location. While additional information can be provided by the user, this is not required for essential route information delivery. The system would determine the current location of the mobile device user. Static information about route paths in the area would then be consulted. The route delivery service would then determine the most optimal route based on length of paths available; RF signal characteristics and information derived therefrom, from transmitting mobile wireless devices in the area, that includes but is not limited to: traffic density and speed on sections of paths; and optionally on user-selected criteria. After delivery of optimal route information, the service could then re-determine the optimal route at intervals, or as conditions change, during the user's progress.

It is also apparent to those skilled in the art that the exemplary embodiments described above may be altered in many ways without departing from the principle and the scope of the invention; and numerous embodiments can be further derived from the present invention. Accordingly, the scope of the invention should be determined by the following claims and their legal equivalents.

What is claimed is:

1. In a wireless communications system comprising an RF receiving site and a mobile device operated by a user, wherein said RF receiving site includes an antenna array, a method of providing customized information related to said user, comprising the steps of:

a) receiving at said antenna array one or more RF signals originating from said mobile device;

b) deriving at least one p-dimensional array vectors from said one or more RF signals sampled from p antennas of said array;

c) using said at least one p-dimensional array vectors to derive a location of said mobile device;

d) using said location to determine said customized information; and e) using said location to select a means to transmit said customized information to an information user.

2. The method of claim 1 further comprising the steps of:

a) deriving a velocity of said mobile device from said one or more RF signals originating from said mobile device;

b) using said velocity to determine said customized information; and c) using said velocity to select a means to transmit said customized information to said information user.

3. The method of claim 1 wherein said information user is said user.

4. The method of claim 1 wherein said information user is an external network.

5. The method of claim 1 wherein said mobile device is a transmitter-receiver, and wherein said customized information is transmitted exclusively to said transmitter-receiver.

6. The method of claim 1 wherein said customized information is transmitted exclusively to a remote receiver.

7. The method of claim 6 wherein said remote receiver is connected to a public display unit, such that said customized information is displayed on said public display unit accessible to said mobile user.

8. The method of claim 7 wherein said public display unit is selected from the group consisting of: an electronic billboard, a display screen at a service station, and a kiosk equipped with wireless reception capability.

9. The method of claim 1 wherein said customized information is transmitted to a broadcaster selected from the group consisting of: a television broadcaster and a radio broadcaster.

10. The method of claim 1 wherein said customized information is transmitted to a data receptacle selected from the group consisting of: an internet web site, an electronic mail account, a pager, a mobile phone, a modem, and a fax machine.

11. The method of claim 1 wherein said customized information includes a location of a service provider in a vicinity of said location of said mobile device.

12. The method of claim 1 wherein said customized information includes traffic conditions in a vicinity of said location of said mobile device.

13. The method of claim 1 wherein said customized information includes service information in a vicinity of said location of said mobile device.

14. The method of claim 13 wherein said service information includes commercial services, advertising information, traffic conditions, public safety and emergency announcements.

15. In a wireless communications system comprising an RF receiving site and a mobile device operated by a user, wherein said RF receiving site includes an antenna array, a method of providing customized information related to said user, comprising the steps of:

a) receiving at said antenna array one or more RF signals originating from said mobile device;

b) deriving at least one p-dimensional array vectors from said one or more RF signals sampled from p antennas of said array;

c) using said at least one p-dimensional array vectors to derive a velocity of said mobile device;

d) using said velocity to determine said customized information; and e) using said velocity to select a means to transmit said customized information to an information user.

16. The method of claim 15 wherein said information user is said user.

17. The method of claim 15 wherein said information user is an external network.

18. The method of claim 15 wherein said mobile device is a transmitter-receiver, and wherein said customized information is transmitted exclusively to said transmitter-receiver.

19. The method of claim 15 wherein said customized information is transmitted exclusively to a remote receiver.

20. The method of claim 19 wherein said remote receiver is connected to a public display unit, such that said customized information is displayed on said public display unit accessible to said mobile user.

21. The method of claim 20 wherein said public display unit is selected from the group consisting of: an electronic billboard, a display screen at a service station, a kiosk equipped with wireless reception capability.

22. The method of claim 15 wherein said customized information is transmitted to a broadcaster selected from the group consisting of: a television broadcaster and a radio broadcaster.

23. The method of claim 15 wherein said customized information is transmitted to a data receptacle selected from the group consisting of: an internet web site, an electronic mail account, a pager, a mobile phone, a modem, and a fax machine.

24. The method of claim 15 wherein said customized information includes commercial services, advertising information, traffic conditions, public safety and emergency announcements.

25. A method of determining a traffic density using a base transceiver connected to an antenna array, said method comprising the steps of:

a) receiving at said antenna array RF signals originating from a plurality of mobile devices, wherein said RF signals comprise p-dimensional array vectors sampled from p antennas of said array; and b) using the p-dimensional array vectors to determine locations of said mobile devices from measured subspaces to which said array vectors are approximately confined.

26. The method of claim 25 further comprising the step of comparing said locations of said mobile devices to positions of roadways, thereby determining traffic densities of a plurality of segments of said roadways.

27. The method of claim 26 further comprising the steps of:

a) determining a location of a remote transceiver;

b) selecting a local roadway segment in a vicinity of said remote transceiver; and c) transmitting to said remote transceiver the traffic density of said local roadway segment.

28. The method of claim 26 further comprising the steps of:

a) receiving a request containing a destination location from a remote transceiver;

b) selecting a roadway segment in a vicinity of said destination location; and c) transmitting to said remote transceiver the traffic density of said roadway segment.

29. The method of claim 28 further comprising the step of updating the traffic density and transmitting the updated traffic density to said remote transceiver.

30. The method of claim 25 wherein said locations are determined at a time $t_1$; and wherein said method further comprises the steps of:

a) determining later locations of said mobile devices at a later time $t_2$; and b) determining velocities of said mobile devices from said locations determined at time $t_1$ and said later locations determined at time $t_2$.

31. The method of claim 30 further comprising the step of using said velocities to determine average traffic speeds on roadways.

32. The method of claim 31 further comprising the steps of:

a) determining a location of a remote transceiver;

b) selecting a local roadway segment in a vicinity of said remote transceiver; and c) transmitting to said remote transceiver the average traffic speed on said local roadway segment.

33. The method of claim 31 further comprising the steps of:

a) receiving a request containing a destination location from a remote transceiver;

b) selecting a roadway segment in a vicinity of said destination location; and c) transmitting to said remote transceiver the average traffic speed on said roadway segment.

34. The method of claim 33 further comprising the step of updating the average traffic speed and transmitting the updated average traffic speed to said remote transceiver.

35. In a wireless communications system comprising a plurality of RF receiving sites, a method of providing customized information related to a user of a mobile device, the method comprising:

a) receiving at a RF receiving site one or more RF signals originating from said mobile device;

b) deriving a p-dimensional array vector from the one or more RF signals;

c) using the p-dimensional array vector to derive a location of said mobile device;

d) using said location to determine said customized information; and e) using said location to select a means to transmit said customized information to the user.

* * * * *